United States Patent

Morehouse

[15] 3,669,913

[45] June 13, 1972

[54] SOLUTION COMPOSITIONS OF SILOXANE-OXYALKYLENE COPOLYMERS AND AMINE CATALYSTS AND USE FOR MANUFACTURE OF POLYURETHANE FOAM

[72] Inventor: Edward Lewis Morehouse, New City, N.Y.

[73] Assignee: Union Carbide Corporation, New York, N.Y.

[22] Filed: Nov. 23, 1970

[21] Appl. No.: 92,145

Related U.S. Application Data

[60] Continuation-in-part of Ser. No. 842,751, May 5, 1969, abandoned, which is a continuation-in-part of Ser. No. 131,765, April 6, 1971, said Ser. No. 842,751, is a division of Ser. No. 573,133, Aug. 12, 1966, Pat. No. 3,505,377.

[52] U.S. Cl. .................. 260/2.5 AH, 252/182, 260/2.5 AC
[51] Int. Cl. ................. C08g 22/46, C08g 31/32, C09k 3/00
[58] Field of Search ............... 260/2.5 AG, 2.5 AH, 2.5 AD, 260/842, 751; 252/400, 182

[56] References Cited

UNITED STATES PATENTS

| | | | |
|---|---|---|---|
| 3,420,782 | 1/1969 | Dahm et al. | 252/400 |
| 2,955,058 | 10/1960 | Foster | 117/104 |
| 2,772,245 | 11/1956 | Simon et al. | 260/2.5 |
| 3,003,977 | 10/1961 | Hurwitz | 260/2.5 |
| 3,563,924 | 2/1971 | Schwarz | 260/2.5 |
| 3,594,334 | 7/1971 | Marlin | 260/2.5 |

FOREIGN PATENTS OR APPLICATIONS

| | | | |
|---|---|---|---|
| 874,766 | 3/1958 | Great Britain | 260/2.5 AG |
| 1,066,142 | 4/1967 | Great Britain | 260/2.5 AH |
| 1,058,159 | 2/1967 | Great Britain | 260/2.5 AH |

OTHER PUBLICATIONS

Dow Corning Corp. Bulletin 05– 128: Surfactants for Urethanes, Midland Mich (1965), 1 page.

*Primary Examiner*—Donald E. Czaja
*Assistant Examiner*—H. S. Cockeram
*Attorney*—Paul A. Rose, Aldo John Cozzi, Eugene C. Trautlein and Marylin Klosty

[57] ABSTRACT

A solution composition, particularly useful for the manufacture of flexible polyether urethane foam, is provided comprising water, a hydrolytically stable siloxane-oxyalkylene block copolymer, an amine polyurethane-foaming catalyst and a water soluble, silicon-free organic surfactant which is capable of raising the cloud point of the solution. Suitable organic surfactants include those having the general formula, $C_9H_{19}C_6H_4(OC_2H_4)_eOH$, wherein $e$ represents any number from about 9 to about 20 inclusive. The compositions may also contain water soluble organic solvents. The presence of the organic surfactant serves to protect the solution from physical separation when subjected to adverse temperature conditions which may be encountered during shipment or storage. A process for the manufacture of polyurethane foam is also provided in which the foam-forming reaction mixture comprises a polyether polyol, a polyisocyanate and the aforesaid solution composition.

16 Claims, No Drawings

SOLUTION COMPOSITIONS OF SILOXANE-OXYALKYLENE COPOLYMERS AND AMINE CATALYSTS AND USE FOR MANUFACTURE OF POLYURETHANE FOAM

This application is a continuation-in-part of my prior and co-pending application Ser. No. 842,751, filed May 5, 1969, which has now been abandoned in favor of continuation-in-part application Ser. No. 131,765, filed Apr. 6, 1971. The said application Ser. No. 842,751 in turn was a division of application Ser. No. 573,133, filed Aug. 12, 1966, now U.S. Pat. No. 3,505,377 granted Apr. 7, 1970.

BACKGROUND OF THE INVENTION

This invention relates to novel aqueous solutions of hydrolytically stable siloxane-oxyalkylene block copolymers which solutions are chemically and physically stable over prolonged periods of time, and to the use of such aqueous solutions for the manufacture of polyurethane foam, particularly flexible polyether urethane foam.

Flexible polyether urethane foams are conventionally prepared by a one step or "one shot" process which comprises the reaction of a polyisocyanate, a hydroxyl-containing polyether, a catalyst for the foaming reaction such as amine and metal catalysts, a blowing agent and a siloxane-oxyalkylene block polymer. Water is advantageously present during the foaming reaction, the presence of water also being a convenient way of generating gaseous carbon dioxide blowing agent in situ due to the reactivity of water and isocyanato functions.

There is demand among manufacturers of flexible urethane foams for premixtures comprising the siloxane-oxyalkylene block copolymers and amine catalyst. Inasmuch as water is advantageously present during the foaming reaction, aqueous premixtures are particularly desirable. However, when such aqueous premixtures are to be shipped long distances to the foam manufacturing plant site or large bulk quantities are used over a prolonged period of time such as up to several months or longer, they must have good storage stability, not only at ordinary ambient temperatures, but also over a wide range of ambient temperatures which may be encountered during shipment or storage.

One of the ingredients which is desirably included in aqueous premixtures is the siloxane-oxyalkylene block copolymer the function of which is to stabilize the polyurethane foam, that is, prevent collapse of the foam until the foamed product has developed sufficient gel strength to become self-supporting. A variety of such copolymers have been proposed as stabilizers for polyurethane foams. One such variety has a silicon-to-oxygen-to-carbon linkage between the siloxane block and the oxyalkylene block. A drawback to such copolymers is that the Si—O—C linkage breaks down relatively rapidly in aqueous media due to hydrolytic cleavage. Therefore, if maximum effectiveness is to be realized, aqueous premixtures of such polyurethane foam stabilizers must be added to the foaming reaction mixture within a relatively short period of time after the premixture is prepared such as a few hours. Another copolymer site susceptible to degradation by hydrolytic cleavage is the end group which caps the oxyalkylene block. Copolymers containing oxyalkylene chains which are capped by acetoxy groups, are not resistant to hydrolysis over prolonged periods of time, and are particularly susceptible to hydrolysis in aqueous basic media such as aqueous solutions containing an amine catalyst. Unless such aqueous solutions are used relatively promptly, polyurethane foams produced therefrom contain an excessive number of closed cells, as evidenced by poor breathability which is, of course, an undesirable property of the foamed product.

From the standpoint of providing aqueous premixtures of silicon-containing foam stabilizers which retain their effectiveness and can be used as such after storage over prolonged periods of time, it is also important that the premixtures be resistant to physical separation of dissolved components over a wide range of ambient temperatures. Thus, if the polyurethane foam stabilizer is hydrolytically stable but separates from the aqueous premixture, the performance of the resulting mixed phase is also poor and does not provide uniformly foamed products.

It is an object of this invention, therefore, to provide chemically and physically stable solution compositions of siloxane-oxyalkylene block copolymers and amine catalysts which solutions retain their effectiveness for the manufacture of polyurethane foam over prolonged periods of time.

Another object is to provide aqueous premixtures having the aforesaid characteristics and which are also thermally stable, liquid solutions which retain their homogeneity upon exposure to otherwise adverse ambient temperatures.

Another object is to provide a method for the production of flexible polyurethane foam based on the use of chemically and physically stable aqueous premixed solutions of siloxane-oxyalkylene copolymer foam stabilizers and an amine catalyst for the foam-producing reaction.

Various other objects and advantages of this invention will become apparent to those skilled in the art from the accompanying disclosure and description.

SUMMARY OF THE INVENTION

In accordance with one aspect of the teachings of this invention, the above objects are accomplished by providing solution compositions containing (1) water, (2) a hydrolytically stable siloxane-oxyalkylene block copolymer such as those having the structure defined in greater detail hereinafter, (3) a silicon-free, water soluble organic surfactant which is capable of raising the cloud point of the solution, and (4) a polyurethane foaming catalyst comprising an amine. The solution compositions of this invention may also contain water soluble, organic solvents.

In accordance with another aspect, the invention also provides a process for producing a flexible polyurethane foam which comprises reacting and foaming a reaction mixture of:

I. a polyether polyol having an average of at least two hydroxyl groups per molecule:

II. a polyisocyanate containing at least two isocyanato groups per molecule, said polyether polyol and said polyisocyanate, taken together, being present in the reaction mixture in a major amount and said polyether polyol and polyisocyanate being present in the reaction mixture in the relative amount required to produce the polyurethane foam; and, III. the aforesaid solution compositions of this invention which are introduced to the reaction mixture in an amount sufficient to provide a foam stabilizing amount of the siloxane-oxyalkylene block copolymer and a catalytic amount of the amine catalyst for the reaction of the polyether polyol and polyisocyanate to produce the polyurethane.

Inasmuch as the premixed solution compositions of this invention are aqueous, water is present during the foaming reaction and serves as a source of carbon dioxide blowing agent. Additional water can be introduced to the foam-producing reaction mixture or an auxiliary blowing agent such as trichlorofluoromethane can also be present, depending upon the desired density of the foamed product.

The cloud points of the aqueous solution premixtures of this invention are higher than the respective cloud points of solutions containing the same ingredients in the same concentration but which do not contain the organic surfactant.

Thus, the aqueous solution compositions of the present invention have improved resistance to physical separation of dissolved components over a relatively wide range of temperatures including adverse elevated ambient temperatures such as, for example, 98° F. or higher, to which the solutions may be exposed during shipment and storage. The aqueous solutions also retain effectiveness for the production of polyurethane foam even though there may be a relatively long lapse of time such as at least 2 to 3 months between their initial preparation and addition to the final polyurethane foam-producing formulation.

DESCRIPTION OF THE PREFERRED EMBODIMENTS

Suitable siloxane-oxyalkylene copolymers for use in the present invention are siloxane-oxyalkylene block copolymers characterized by water solubility, a silicon-to-carbon linkage between a siloxane and oxyalkylene blocks, and an oxyalkylene chain having a terminal group which is both hydrolytically stable and essentially non reactive with the ingredients of the foam-producing reaction mixture.

The amount of siloxane-oxyalkylene copolymer which is present in the solution compositions of this invention can vary from about 5 to about 40 parts by weight per 100 parts by weight of the solution composition.

One class of siloxane-oxyalkylene copolymers employed in the practice of this invention are the high potency, water soluble, hydrolytically stable copolymer foam stabilizers described and claimed in my aforesaid U.S. Pat. No. 3,505,377. Such high potency foam stabilizers are represented by the following Formula A:

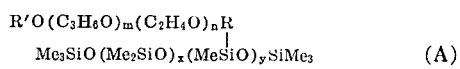

$$Me_3SiO(Me_2SiO)_x(Me\overset{|}{S}iO)_ySiMe_3 \qquad (A)$$

wherein R' is a monovalent hydrocarbon group containing from 1 to 10 carbon atoms (preferably an alkyl group containing from one to four carbon atoms inclusive); R is an alkylene group containing at least two carbon atoms and up to four or more carbon atoms (preferably containing three carbon atoms); $m$ and $n$ are numbers, the sum of $m + n$ being such that the oxyalkylene block, $R'O(C_3H_6O)_m(C_2H_4O)_n$, has an average molecular weight of at least 1,500; from 15 to 60 weight-percent of the oxyalkylene units are oxyethylene units; $x$ has a value of at least 40 (preferably at least 50 or 70) and can have a value up to 200 (preferably up to 125 or 150); $y$ has a value of at least 3 (preferably from 4 to 15); the siloxane block constitutes from 15 to 70 weight percent of the block copolymer, and Me is a methyl group. The average molecular weight of the oxyalkylene block of the copolymer components of the solution compositions of the invention is usually no higher than about 6,000.

Typical of the groups represented by R' in Formula A are the alkyl groups (e.g. the methyl, ethyl, propyl and butyl groups), the aryl groups (e.g. the phenyl and tolyl groups) and the aralkyl groups (e.g. the benzyl and betaphenylethyl groups). Typical of the groups represented by R in Formula A are the ethylene, propylene, butylene and amylene groups.

The siloxane-oxyalkylene block copolymers encompassed by Formula A are readily produced by well known processes such as, for example, by an addition reaction between a siloxane having SiH groups and an alkenyl end-blocked oxyalkylene polymer (polyether). The reaction is conducted by heating the reactants in the presence of a platinum catalyst (e.g., finely divided elemental platinum supported on alumina or charcoal or chloroplatinic acid).

It is to be understood that the present invention does not depend on the use of the siloxane-oxyalkylene block copolymers defined by Formula A and that any other copolymers having the aforesaid characteristics may be used as a component of the solution compositions of the invention.

A second essential component of the aqueous solution compositions of the invention is a water soluble, silicon-free organic surfactant which is capable of raising the cloud point of a given aqueous solution containing the block copolymer and amine catalyst. Generally, the organic surfactant component is present in the aqueous solutions of this invention in an amount of from about 0.25 to about 30 parts by weight per hundred parts by weight of the solution.

Illustrative of suitable organic surfactants employed in accordance with the present invention are the ethylene oxide adducts of nonylphenol represented by the general Formula B:

$$C_9H_{19}-C_6H_4-(OC_2H_4)_eOH \qquad (B)$$

wherein $e$ is a number from about 9 up to about 20 or more. It is to be understood that the value of $e$ includes whole and fractional numbers such as 9, 10.5, 13, 14.5 and 15 and the like.

Nonionic organic surfactants represented by Formula B are products obtained by reacting about one mole of nonylphenol and $e$ moles of ethylene oxide wherein $e$ has the aforesaid significance. Such polyoxyethylene adducts of nonylphenol are suitably employed as essentially the sole organic surfactant component present in the aqueous premixtures described herein, or various combinations thereof may be employed.

In addition to water and the aforesaid siloxane-oxyalkylene copolymer and organic surfactant, the aqueous solutions of this invention also contain a water soluble amine which is a catalyst for the polyurethane foam-producing reaction of a polyether polyol and a polyisocyanate. This component is usually a tertiary-amine. Illustrative of the amine components of the aqueous premixtures described herein are the following: N-methylmorpholine, N-ethylmorpholine, hexadecyldimethylamine, triethylamine, tributylamine, tri-octylamine, N,N,N', N'-tetramethyl-1,3-butanediamine, N,N-dimethylethanolamine, tri-ethanolamine, tri-isopropanolamine, N-methyldiethanolamine, bis(2-dimethylaminoethyl)ether, N,N,N'N'-tetramethylethylenediamine, 4,4'-methylene bis (2-chloroaniline), dimethylbenzylamine, N-octadecylmorpholine (N-cocomorpholine), triethylene diamine (i.e., 1,4-diazabicyclo[2.2.2]octane), the formate salts of triethylene diamine, other salts of triethylene diamine and oxyalkylene adducts of primary and secondary amino groups, and other such amine catalysts which are well known in the art of flexible and semi-flexible polyether polyurethane foam preparation. All of the aforesaid amines may be used as essentially the sole amine of the aqueous premixtures of this invention, or any combination of two or more amines may be employed.

The concentration of total active amine component in the solution compositions of this invention is usually from about 3 to about 10 parts by weight per 100 parts by weight of the solution.

As desired, the premixed solution compositions of this invention may also contain a water soluble organic solvent which has substantially no adverse affect on the desired properties of the premixture or the other reactants present in the foam-producing formulation to which the premixture is ultimately added. Suitable additives of this type are the water soluble alkylene oxide adducts of starters such as water, mono-ols, diols and other polyols including triols. The mono-ol and polyol starters are typically illustrated by butanol, propylene glycol, glycerol and 1,2,6-hexanetriol. Preferred adducts of the organic starters are the mixed alkylene oxide adducts, particularly those containing a combination of oxyethylene and oxypropylene units. For example, one class of such organic solvents which may be present in the aqueous solutions of this invention, are water soluble, mixed ethylene oxide-propylene oxide adducts of butanol which are represented by the general formula, $HO(C_2H_4O)_y(C_3H_6O)_z C_4H_9$, wherein the weight per cent of ethylene oxide units is about equal to the weight per cent of propylene oxide units. Such butanol-started compounds have different molecular weights and thus different viscosities (e.g. 12, 34, 96 and 245 centistokes at 25° C.) and one or more of such compounds may be present in the aqueous premixtures of this invention.

The solution compositions of this invention are prepared by combining the four essential ingredients, namely, water, siloxane-oxyalkylene block copolymer, amine catalyst and organic surfactant components in any order. The active components may be added in non diluted form or in the form of a solution in water soluble organic solvents such as those described above. Water is usually present as the major component of the compositions of this invention and thus the other components are usually added thereto in order to facilitate and obtain better mixing. At any stage of the preparation of the aqueous solution compositions of this invention, one or more of the above-described water soluble organic solvents can be added as such, that is, independently of any other ingredient. Such organic solvents can also be introduced to the aqueous solutions as the carrier solvent of the amine and/or siloxane-oxyalkylene block copolymer components. Examples of solvents in which the amine catalyst component can be pre-dissolved and which are thereby introduced to the solution compositions described herein, include water soluble glycols such as diethylene glycol, dipropylene glycol and 2-methyl-2,4-pentanediol. One class of suitable carrier solvents for the copolymer component are the above-described water soluble mixed ethylene oxide-propylene oxide adducts of butanol wherein the weight per cent of ethylene oxide units is about equal to the weight per cent of propylene oxide units. Such copolymer-solvent solutions preferably contain from 25 to 75 parts by weight of the copolymer per 100 parts by weight of the solvent and the copolymer, but can contain from 1 to 99 parts of the copolymer.

The hydrolytically and physically stable aqueous premixtures of this invention are particularly useful for the production of flexible and semiflexible polyurethane foams. Inasmuch as the premixtures contain the siloxane-oxyalkylene block copolymer foam stabilizer, amine catalyst for the polyurethane-foaming reaction and water as a source of blowing action, the only other ingredients which need be added to the foam producing reaction mixture are the reactants which provide the polyurethane linkage, that is, a polyether polyol and a polyisocyanate. It is to be understood, however, that, as desired, minor amounts of other ingredients may be present in the final foam-producing formulation. Such additives are, for example, auxiliary blowing agents, metal catalysts, flame retardants, fillers, crosslinking agents, anti-yellowing agents and the like.

One method for producing flexible and semiflexible foams utilizing the solution compositions of this invention is the prepolymer technique. In accordance with this method, a polyether polyol and a polyisocyanate are prereacted such that a substantial amount of unreacted isocyanate groups remain. The resulting prepolymer is then combined with the aqueous premixtures of this invention and, as desired, a metal catalyst and supplementary blowing agent are utilized Usually, however, a one-shot process is used in which a prepolymer is not used but instead the polyether polyol and polyisocyanate are independently added to the foam-producing reaction mixture. Typically, in following the one-shot technique, the aqueous premixtures described herein are combined with the polyether polyol reactant, adding a supplementary blowing agent, if desired, and then, with agitation, a metal co-catalyst may be added, followed by the addition of the polyisocyanate. Usually, the above ingredients are combined at a temperature between about 15° C. and about 50° C. and maintained within this temperature range until the foaming reaction commences after which the foaming reaction mixture is poured into a mold wherein the mixture expands to form the polyurethane foam. Often the resulting foam is cured by heating the foam at a temperature between about 100° C. and about 150° C. (e.g., about 130° C.) to obtain a stable, tack-free, resinous foam capable of supporting a load, within a relatively short period of time (e.g., about 5–30 minutes) whereas longer times are required to obtain a cured, tack-free resin at room temperature. It is to be understood that variations in process conditions and manipulative steps may be used as known in the art. For example, it is not essential to pour the foaming reaction mixture into a mold since the various ingredients can be combined and the foaming reaction commenced and completed in a mold.

The polyhydroxyl reactants (organic polyols) employed as a starting material to prepare flexible as well as semiflexible polyurethane foam using the aqueous premixtures of this invention, are the polymeric polyhydric alcohols comprising a plurality of acyclic ether oxygens and containing at least two alcoholic hydroxyl radicals. One class of such reactants are the polyether polyols (also commonly referred to as "-polyethers") including linear and branched chain compounds. Illustrative polyethers include the polyoxyalkylene polyols containing one or more chains of oxyalkylene radicals which are prepared by the reaction of one or more alkylene oxides with acyclic and alicyclic polyols. Examples of the polyoxyalkylene polyols include the polyoxyethylene glycols prepared by the addition of ethylene oxide to water, ethylene glycol or diethylene glycol; polyoxypropylene glycols prepared by the addition of propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and propylene oxide; and the polyoxybutylene glycols and copolymers such as polyoxyethylene-oxybutylene glycols and polyoxypropylene-oxbutylene glycols. Included in the term "polyoxybutylene glycols" are polymers of 1,2-butylene oxide and 2,3-butylene oxide.

Illustrative of further polyhydroxyl-containing materials useful in the preparation of polyurethane foams are the polyether polyols obtained by the chemical addition of alkylene oxides including ethylene oxide, propylene oxide, butylene oxide and mixtures thereof, to the following polyhydroxyl containing compounds: glycerol; 1,2,6-hexanetriol; 1,1,1-trimethylolethane; 1,1,1-trimethylolpropane; 3-(2-hydroxyethoxy)-1,2-propanediol; 3-(2-hydroxypropoxy)-1,2-propanediol; 2,4-dimethyl-2-(2-hydroxyethoxy)-methylpentanediol-1,5; 1,1,1-tris[(2-hydroxyethoxy)-methyl]ethane; 1,1,1-tris[(2-hydroxypropoxy)methyl]-propane; diethylene glycol; trimethylene glycol; 1,2-butylene glycol; 1,3-butanediol; 1,4-butanediol; 1,5-pentanediol; 1,2-hexylene glycol; 1,10-decanediol; 1,2-cyclohexanediol; 2-butene-1,4-diol; 3-cyclohexene-1,1-dimethanol; 4-methyl-3-cyclohexene-1,1-dimethanol; 3-methylene-1,5-pentanediol; diethylene glycol; (2-hydroxyethoxy)-1-propanol; 4-(2-hydroxyethoxy)-1-butanol; 5-(2-hydroxypropoxy)-1-pentanol; 1-(2-hydroxymethoxy)-2-hexanol; 1-(2-hydroxypropoxy)-2-octanol; 3-allyloxy-1,5-pentanediol; 2-allyloxymethyl-2-methyl-1,3-propanediol, [4,4-pentyloxymethyl]-1,3-propanediol; 3(o-propenyl-phenoxy) 1,2-propanediol; 2,2-diisopropylidene-bis-(p-phenyleneoxy)-diethanol; pentaerythritol; sorbitol; sucrose; lactose; glycosides such as methyl, ethyl, propyl, butyl and 2-ethylhexyl arabinoside, xyloside, fructoside, glucoside, alpha-methylglucoside, alphahydroxyalkyl glucoside and rhammoside; and the like; phenolformaldehyde condensation products such as the novolak resins; or phosphoric acid; benzenephosphoric acid; polyphosphoric acids such as tripolyphosphoric acid and tetrapolyphosphoric acid; as well as mixtures of any of the aforesaid polyols.

Further typical examples of suitable polyether polyols that are used in the present invention are prepared by reacting a 1,2-alkylene oxide such as ethylene oxide, propylene oxide, butylene oxide or mixtures thereof with: mononuclear polyhydroxybenzenes such as resorcinol, pyrogallol, phloroglucinol, hydroquinone, 4,6-di-t.-butylcatechol or catechol; and polynuclear hydroxybenzenes such as the various di-, tri-, and tetraphenylol compounds in which two to four hydroxybenzene groups are attached by means of single bonds or by an aliphatic hydrocarbon radical containing one to twelve carbon atoms. The term "polynuclear" as distinguished from "mononuclear" is used to designate at least two benzene nuclei in a compound. Exemplary diphenylol compounds include 2,2-bis(p-hydroxphenyl)-propane; bis(p-hydroxyphenyl)-methane and the various diphenols and diphenylol methanes disclosed in U.S. Pat. Nos. 2,506,486 and 2,744,882, respectively.

The alkylene oxides employed in producing the aforesaid polyoxyalkylene polyols usually have from two to four carbon atoms of which propylene oxide and mixtures of propylene oxide with ethylene oxide are preferred.

A preferred class of polyether polyols employed in the process of this invention have the following general formula:

$$R'''[(OC_aH_{2a})_bOH]_c$$

wherein $R'''$ is hydrogen or a polyvalent hydrocarbon radical; $c$ is an integer having a value of from 1 to 3 and is equal to the valence of $R'''$; $a$ is an integer from 2 to 4 inclusive and is preferably 2 to 3; and $b$ is an integer having a value of from 2 to about 100, preferably from 7 to about 50. Poly-(oxyethylene-oxypropylene) triols are particularly useful.

Although the above polyether polyols can be reacted as such in producing polyurethane foams, another type of polyether polyol that is suitable for the production of polyurethane foam are graft polymer/polyether compositions obtained by polymerizing ethylenically unsaturated monomers in a polyether as described in British Pat. No. 1,063,222 and U.S. Pat. No. 3,383,351, the disclosures of which are incorporated herein by reference thereto. Suitable monomers for producing such compositions include, for example, those polyethers described hereinabove. These graft polymer/polyether compositions can contain from about 1 to about 70 weight percent, preferably from about 5 to about 50 weight percent and most preferably about 10 to about 40 weight percent of the monomer polymerized in the polyether. Such compositions are conveniently prepared by polymerizing the monomers in the selected polyether at a temperature of 40° to 150° C. in the presence of a free radical polymerization catalyst, such as peroxides, persulfates, percarbonates, perborates and azo compounds as more fully described by the aforesaid patent references. The resulting compositions may contain a small amount of unreacted polyether, monomer and free polymer as well as the graft polymer/-polyether complex. Especially preferred are the graft polymer/polyethers obtained from acrylonitrile and polyether triols.

In preparing polyurethane foams in accordance with the present invention, it is to be understood that mixtures of any of the aforesaid polyether polyols can be employed as reactants with the organic polyisocyanate including, for example, a mixture of a triol, diol, tetra-ol and ploymer/polyol. The particular polyether polyol or polyols employed depends upon the end-use of the polyurethane foam. Usually, diols provide soft foams, firmer foams being obtained by the incorporation of short chain polyether polyols having more than two hydroxyl groups, including triols, tetra-ols, pentols and hexols. When it is desired to produce polyurethane articles having comparatively high load-bearing properties, polymer/polyol reactants of the aforesaid type are useful.

The molecular weight and the hydroxyl number of the polyether polyol reactant are selected properly to result in flexible or semiflexible foams. The total polyols including crosslinking agents, if used, preferably possess an average hydroxyl number of from about 45 to about 70 when a flexible foam is the desired product, and from about 50 to about 250 or more when employed in semiflexible foam formulations. Such limits are not intended to be restrictive, but are merely illustrative of the large number of possible combinations of polyols that can be employed.

The hydroxyl number is defined as the number of milligrams of potassium hydroxide required for the complete neutralization of the hydrolysis product of the fully acetylated derivative prepared from 1 gram of polyol or mixtures of polyols with or without other crosslinking additives used in the invention. The hydroxyl number can also be defined by the equation:

$$OH = \frac{56.1 \times 1000 \times f}{m.w.}$$

wherein
OH = hydroxyl number of the polyol
$f$ = average functionality, that is, average number of hydroxyl groups per molecule of polyol
m.w. = average molecular weight of the polyol.

In producing polyurethane foams using the aqueous premixtures of this invention, a variety of organic isocyanates can be employed in the final foam formulation for reaction with the polyether polyol. Preferred are polyisocyanates having the general formula:

$$Q(NCO)_i$$

wherein $i$ is an integer of two or more and Q is an organic radical having the valence of $i$. Q can be a substituted or unsubstituted hydrocarbon group (e.g., an alkylene or an arylene group). Q can be a group having the formula $Q'-Z-Q'$ where $Q'$ is an alkylene or arylene group and Z is $-O-$, $O-Q'-O-$, $-CO-$, $-S-$, $-S-Q'-S-$, or $-SO_2-$. Examples of such compounds include hexamethylene diisocyanate, 1,8-diisocyanato-p-menthane, xylylene diisocyanate, (OCNCH$_2$CH$_2$h$_2$OCH$_2$)$_2$O, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4-triisocyanate, and isopropylbenzene-alpha-4-diisocyanate.

In the above general formula, $Q(NCO)_i$ Q can also represent a polyurethane radical having a valence of $i$ in which case $Q(NCO)_i$ is a composition conventionally known as a prepolymer. Such prepolymers are formed by reacting a stoichiometric excess of a polyisocyanate such as those described herein with the polyether polyol. In the preparation of such prepolymers, usually the polyisocyanate is employed in proportions of from about a 30 percent to about a 200 percent stoichiometric excess, the stoichiometry being based upon equivalents of isocyanate groups per equivalent of hydroxyl groups in the polyol.

Further included among the isocyanates useful in the process of this invention are dimers and trimers of isocyanates and diisocyanates and polymeric diisocyanates such as those having the general formula:

$$[Q(NCO)ib]_j$$

in which $i$ and $j$ are integers of two or more, and/or (as additional components in the reaction mixtures) compounds of the general formula:

$$L(NCO)_i$$

in which $i$ is one or more and L is a mono-functional or polyfunctional atom or radical. Examples of this type include ethylphosphonic diisocyanate, $C_2H_5P(O)(NCO)_2$; phenylphosphonic diisocyanate, $C_6H_5P(O)(NCO)_2$; compounds containing a Si—NCO group, isocyanates derived from sulfonamides ($QSO_2NCO$), cyanic acid, thiocyanic acid, and compounds containing a metal —NCO radical such as tributyltin isocyanate.

Further illustrative examples of the polyisocyanate component employed in producing polyurethanes in accordance with the process of this invention are the following specific compounds as well as mixtures of two or more of them: 2,4-tolylene diisocyanate, 2,6-tolylene diisocyanate, crude tolylene diisocyanate, bis(4-isocyanatophenyl)methane, polymethylene polyphenylisocyanates that are produced by phosgenation of anilineformaldehyde condensation products, dianisidine diisocyanate, toluidine diisocyanate, bis(2-isocyanatoethyl)fumarate, bis(2-isocyanatoethyl)carbonate, 1,6-hexamethylene-diisocyanate, 1,4-tetramethylene-diisocyanate, 1,10-decamethylene-diisocyanate, cumene-2,4-diisocyanate, 4-methoxy-1,3-phenylene diisocyanate, 4-chloro-1,3-phenylene-diisocyanate, 4-bromo-1,3-phenylene-diisocyanate, 4-ethoxy-1,3-phenylenediisocyanate, 2,4'-diisocyanato-diphenylether, 5,6-dimethyl-1,3-phenylenediisocyanate, 2,4-dimethyl-1,3-phenylenediisocyanate, 4,4'-diisocyanatodiphenylether, bis 5,6-(2-isocyanatoethyl)-bicyclo [2.2.1]hept-2-ene, benzidinediisocyanate, 4,6-dimethyl-1,3-phenylenediisocyanate, 9,10-anthracenediisocyanate, 4,4'-diisocyanatodibenzyl, 3,3-dimethyl-4,4'-diisocyanatodiphenylmethane, 2,6-dimethyl-4,4'-diisocyanatodiphenyl, 2,4-diisocyanatostilbene, 3,3'-dimethyl-4,4'-diisocyanatodiphenyl, 3,3'-dimethoxy-4,4'-diisocyanatodiphenyl, 1,4-anthracenediisocyanate, 2,5-fluorene-diisocyanate, 1,8-naphthalenediisocyanate, 2,6-diisocyanatobenzfuran, 2,4,6-toluenetriisocyanate, and many other organic polyisocyanates that are known in the art, such as those that are disclosed in an article by Siefken, Ann., 565, 75 (1949). In general, the aromatic polyisocyanates are preferred.

Other isocyanate components which are useful in producing polyurethane foams in accordance with this invention are combinations of isomeric diisocyanates with polymeric isocyanates containing more than two isocyanate groups per molecule such as polymeric isocyanates having an average isocyanate function of from 2.1 to about 3.0. Illustrative of such a combination is a mixture of 2,4-tolylene diisocyanate, 2,6- tolylene diisocyanate and polymethylene polyphenylisocyanate, and also a mixture of isomeric tolylene diisocyanates with polymeric tolylene diisocyanates obtained as residues from manufacture of the diisocyanates.

The amount of polyisocyanate employed will vary slightly depending on the nature of the polyurethane being prepared. In general the polyisocyanates are employed in amounts that provide from 80 to 150 per cent, preferably from 90 to 120 percent of the stoichiometric amount of the isocyanato groups required to react with all of the hydroxyl groups of the organic polyol starting materials and water. The reaction of water and isocyanate generates carbon dioxide blowing agent. Most preferably, a slight amount of isocyanato groups in excess of the stoichiometric amount is employed.

Auxiliary blowing agents which can be employed in the process of this invention include methylene chloride, liquefied gases which have boiling points below 80° F. and above minus 60° F., or other inert gases such as nitrogen, additional carbon dioxide, methane, helium and argon. Suitable liquefied gases include saturated aliphatic fluorohydrocarbons which vaporize at or below the temperatures of the foaming mass. Such gases are at least partially fluorinated and can also be otherwise halogenated. Fluorocarbon blowing agents suitable for use in foaming the formulations of this invention include trichloromonofluoromethane, dichlorodifluoromethane, dichlorofluoromethane, 1,1-chloro-1-fluoroethane, 1-chloro-1,1-difluoro-2,2-dichloroethane, and 1,1,1-trifluoro-2-fluoro-3,3-difluoro-4,4,4-trifluorobutane.

The amount of blowing agent present during the foaming reaction will vary with the density desired in the foamed product. Usually from about 2 to about 20 parts by weight of the blowing agent per 100 parts by weight of the organic polyol starting materials are preferred.

The foam-producing reaction mixture also contains one or more of the above-described amine catalysts which are introduced thereto in the form of the aqueous solution compositions of this invention. The amount of each such amine catalyst which can be present in the final foam-producing recipe is from about 0.05 to about 2 parts by weight per 100 parts by weight of the organic polyol starting materials.

In addition to amine catalysts, the foam-producing formulation can also contain metal catalysts which are particularly useful in promoting gellation of the foaming mixture. Such supplementary catalysts are added to the foam-producing formulation independently of the aqueous solution compositions of this invention. Useful metal catalysts include organo-tin compounds, particularly tin compounds of carboxylic acids such as, for example, stannous octoate, stannous oleate, stannous acetate, stannous laurate, dibutyltin dilaurate, and other such tin salts. Additional metal catalysts are organo-compounds of other polyvalent metals such as zinc and nickel (e.g., nickel acetylacetonate), or other such metal catalysts which are well known in the art of flexible polyether urethane foam manufacture. The amount of each such metal catalyst which can be present in the foam-producing reaction mixture is from about 0.05 to about 2 parts by weight per 100 parts by weight of the polyol starting materials.

The foam-producing reaction mixture also requires the presence of the oxyalkylene-siloxane block copolymer foam stabilizer which is introduced to the reaction mixture as a component of the aqueous solution compositions of this invention. The amount of block copolymer which can be present in the foam-producing reaction mixture ranges from about 0.2 to about 5 parts by weight or greater, per 100 parts by weight of the organic polyol starting material. Generally, there is no commensurate advantage to using amounts of copolymer greater than about 5 parts by weight.

If desired other additional ingredients can be employed in minor amounts in producing the polyether urethane foams in accordance with the process of this invention. Thus inhibitors (e.g. d-tartaric acid, tertiary-butyl pyrocatechol and "Ionol") can be employed to reduce any tendency of the foam to hydrolytic or oxidative instability. Flame retardants (e.g., tris(2-chloroethyl) phosphate can be used. Examples of other additives that can be employed are crosslinkers such as glycerol, triethanol amine and their oxyalkylene adducts and anti-yellowing agents.

The relative amounts of the various components reacted in accordance with the above-described process for producing flexible polyether urethane foams in accordance with this invention are not narrowly critical. The polyether and the polyisocyanate are present in the foam-producing formulation in a major amount. The relative amounts of these two components is the amount required to produce the urethane structure of the foam and such relative amounts are well known in the art. The source of the blowing agent (i.e., water), auxiliary blowing agents, amine catalyst, and block copolymer foam stabilizers are each present in a minor amount necessary to achieve the function of the component. Thus, the blowing agent is present in a minor amount sufficient to foam the reaction mixture, the amine catalyst and any metal catalyst are each present in a catalytic amount (i.e., an amount sufficient to catalyze the reaction to produce the urethane at a reasonable rate), and the oxyalkylene-siloxane block copolymers are present in a foam-stabilizing amount (i.e., in an amount sufficient to stabilize the foam).

The flexible and semiflexible polyether urethane foams produced in accordance with this invention can be used for well known purposes. Thus, the foamed products can be used wherever cushioning is desired, such as furniture, transportation systems, automobiles, planes, etc.; in carpeting; and in the packaging of delicate objects.

The following examples illustrate the present invention and are not to be regarded as limitative.

The following terms are used to describe the quality of the foams produced in the examples:

"CPI" is used for "cells per inch." This denotes the number of cells per linear inch of the foam. CPI is directly proportional to the fineness of the cell structure.

"Rise" denotes the foam height. Rise is directly proportional to potency of the silicon-containing surfactant.

"Breathability" denotes, and is directly proportional to, the amount of open cells in the foam.

"NOPCO Breathability" denotes the breathability test procedure as described by R.E. Jones and G. Fesman, Journal of Cellular Plastics, January 1965.

For the sake of brevity, the designations indicated in the following Table I are used to denote; the various amine catalysts and water soluble organic solvents employed in the preparation of solution compositions of the examples, and the polyether polyols employed as reactants in the foam-producing reactions.

TABLE I

| Designation | Composition |
|---|---|
| | Amine Catalysts |
| Amine Catalyst A | This is a solution consisting of about 70 weight per cent of bis(N,N-dimethylaminoethyl)ether and about 30 weight per cent of dipropylene glycol solvent. |
| Amine Catalyst B | This is a solution consisting of about 33 weight per cent of triethylenediamine and about 67 weight per cent of dipropylene glycol solvent |
| | Organic Solvents |
| Solvent A | This is a butanol-started polyether mono-ol containing oxyethylene and oxypropylene units and has an average molecular weight of about 1700; the respective weight percentages of the oxyethylene |

| | |
|---|---|
| Solvent B | and oxypropylene units are about the same. The average formula is: $C_4H_9(OC_2H_4)_{19}(OC_3H_6)_{14}OH$. |
| | This is a butanol-started polyether mono-ol containing oxyethylene and oxypropylene units and has an average molecular weight of about 1000; the respective weight percentages of the oxyethylene and oxypropylene units is about the same. The average formula is: $C_4H_9(OC_2H_4)_{10}(OC_3H_6)_8OH$. |
| Polyols | |
| Polyol A* | This is a glycerol-started polyether triol, having a molecular weight of about 2900 and a hydroxyl No. of about 58/1/. |
| Polyol B* | This is a polyether diol derived from dipropylene glycol and has a molecular weight of about 2300 and a hydroxyl No. of about 49/1/. |
| Polyol C* | This is a mixture of about 75 weight per cent of Polyol A and about 25 weight per cent of Polyol B, and has a hydroxyl No. of about 56. |
| Polyols | |
| Polyol D | This is a polyether triol/polyether diol mixture having a molecular weight of about 3700, a hydroxyl No. of about 47, and an ethylene oxide content of approximately 14 per cent. |

*Polyol A and Polyol B were used to provide Polyol C.
(1) The polyol contains oxypropylene and oxyethylene units, the average oxyethylene content being about 7 weight per cent.

Further, the designations indicated in the following Table II are used to denote the siloxane-oxyalkylene copolymers employed in the examples. As indicated in Table II, Copolymers I and II are presented for the purpose of comparison.

TABLE II.—AVERAGE COMPOSITIONS OF POLYSILOXANE-POLYOXYALKYLENE BLOCK COPOLYMERS HAVING THE GENERIC FORMULA $$Me_3SiO(Me_3SiO)_x[WO-(\overset{Me}{\underset{|}{C}}HCH_2O)_m(CH_2CH_2O)_n-C_3H_6\overset{Me}{\underset{|}{Si}}O]_ySiMe_3$$

wherein each Me represents a methyl group and the average values of $x$, $m$, $n$ and $y$ and the definition of WO are as follows—

| Copolymer | $x$ | $m$ | $n$ | $y$ | WO |
|---|---|---|---|---|---|
| A | 72 | 29 | 20 | 5.1 | MeO— |
| B | 73 | 29 | 20 | 4 | MeO— |
| I* | 72 | 29 | 20 | 5 | HO— |
| II* | | (¹) | | | MeC(O)O— |

¹ Analysis of Copolymer II indicates that it conforms to the generic formula shown in this table and that it is similar to Copolymer A except that Copolymer II has an acetoxy endblocking group on each oxyalkylene block whereas Copolymer A has methoxy endblocking groups.
*Copolymers I and II are presented for the purpose of comparison.

A control solution, designated as Solution K, was prepared by the independent addition to water of Amine Catalyst A and Amine Catalyst B, followed by the addition of Copolymer A. The amount of each component added is shown in Table III. Another such solution was prepared and is designated herein as Solution K'.

TABLE III

| Component | Parts by Weight |
|---|---|
| Water | 62.7 |
| Amine Catalyst A | 1.8 |
| Amine Catalyst B | 5.2 |
| Copolymer A | 16.7 |
| | 86.4 |

A further solution, designated as Solution K-1, is also presented for the purpose of comparison and was prepared following the above procedure except that 13.6 parts by weight of Solvent A were added as the final ingredient.

EXAMPLES I–X

A series of solution compositions of the present invention, designated herein as Solutions A through J, were prepared by adding Amine Catalyst A and Amine Catalyst B (1.8 and 5.2 parts, respectively) to water (62.7 parts by weight) followed by the addition of Copolymer A, organic surfactant and, in some of the examples, water soluble organic solvent. In the preparation of Solutions A and B, Copolymer A was added to the aqueous medium as a solution containing water soluble organic solvent and organic surfactant. In the preparation of Solutions C, D and F, Copolymer A and organic surfactant were added as separate streams and water soluble organic solvent was added, as such, to the aqueous medium. The respective compositions of Solutions A through J and of above described comparative Solutions K, K' and K-1 to which no organic surfactant had been added, are set forth in the following Table IV wherein the cloud points of the respective solutions are also given.

The cloud points given in Table IV were determined using the following procedure:

A 100 gram sample of the solution was weighed into a 150 milliliter short-form beaker. The solution was heated while stirring with a thermometer. At the time the cloud point was determined, the beaker was removed from the hotplate and the thermometer immersed vertically, centered away from the walls and just off the bottom. The cloud point was that temperature at which the immersed portion of the thermometer just disappeared from view. The mixture was cooled and the determination repeated until results checked within 1°.

TABLE IV

| Example | I | II | III | IV | V | VI | VII | VIII | IX | X |
|---|---|---|---|---|---|---|---|---|---|---|
| Solution designations | *K | *K' | *K-1 | A | B | C | D | E | F | G | H | I | J |
| Water, parts by weight | 62.7 | 62.7 | 62.7 | 62.7 | 62.7 | 62.7 | 62.7 | 62.7 | 62.7 | 62.7 | 62.7 | 62.7 | 62.7 |
| Catalyst, parts by weight: | | | | | | | | | | | | | |
| Amine catalyst A | 1.8 | 1.8 | 1.8 | 1.8 | 1.8 | 1.8 | 1.8 | 1.8 | 1.8 | 1.8 | 1.8 | 1.8 | 1.8 |
| Amine catalyst B | 5.2 | 5.2 | 5.2 | 5.2 | 5.2 | 5.2 | 5.2 | 5.2 | 5.2 | 5.2 | 5.2 | 5.2 | 5.2 |
| Copolymer A, parts by weight | 16.7 | 16.7 | 16.7 | 16.7 | 16.7 | 16.7 | 16.7 | 16.7 | 16.7 | 16.7 | 16.7 | 16.7 | 16.7 |
| Organic surfactant: | | | | | | | | | | | | | |
| $C_9H_{19}C_6H_4(OC_2H_4)_eOH^1$ average value of $e$ | | | | 10.5 | 10.5 | 10.5 | 10.5 | 10.5 | 10.5 | 13 | 15 | 20 | 9 |
| Parts by weight | | | | 1.4 | 1.4 | 1.4 | 6.8 | 13.6 | 13.6 | 13.6 | 13.6 | 13.6 | 13.6 |
| Organic solvent, parts by weight: | | | | | | | | | | | | | |
| Solvent A | | | 13.6 | 12.2 | | 13.6 | 6.8 | | 13.6 | | | | |
| Solvent B | | | | | 12.2 | | | 12.2 | | | | | |
| Total parts of solution, by weight | 86.4 | 86.4 | 100 | 100 | 100 | 113.6 | 100 | 100 | 113.6 | 100 | 100 | 100 | 100 |
| Bulk cloud point, °F | 96 | 95 | 93 | 91 | 99 | 98 | 118 | 125 | 131 | 127 | 119 | 115 | 124 |
| Bulk freezing point, °F | | 26 | | 21 | 14 | 14 | 18 | 24 | 17 | 24 | | | |

¹ These organic surfactants are the reaction products of one mole of nonylphenol and $e$ moles of ethylene oxide wherein the average value of $e$ in the particular surfactant is as indicated.
* Not of the invention.

Inspection of Table IV shows that the solution compositions of this invention, namely, Solutions A through J, had higher cloud points and thus improved physical stability when subjected to an elevated temperature, than comparative Solutions K and K'. Solution K-1 which contained the indicated water soluble organic solvent but no organic surfactant, actually depressed the cloud point. The freezing points given in Table IV also show that the solutions remain liquid at temperatures substantially below the freezing point of water.

EXAMPLE XI

The following premixture, designated as Solution L, was aged at 95° F., the components and proportions of components corresponding to those of Solution A of Table IV above.

SOLUTION L

| Component | Parts by Weight |
| --- | --- |
| Water | 62.7 |
| Amine Catalyst A | 1.8 |
| Amine Catalyst B | 5.2 |
| Copolymer A | 16.7 |
| Adduct of 10.5 moles of ethylene oxide and one mole of nonylphenol | 1.4 |
| Solvent A | 12.2 |

Portions of Solution L as freshly prepared and after 40 and 90 days aging at 95° F. were used in producing flexible polyether polyurethane foam using four-fingered channel mold and free rise procedures and the foam formulation given in Table V. In the channel mold test, proportions of ingredients are based on 300 grams of polyol for pouring into a closed aluminum, four-fingered channel mold. In the free rise test, proportions of ingredients are based on 350 grams of polyol for pouring into an open top container (12 inches × 12 inches × 12 inches).

TABLE V

Foam Formulation

| Component | Parts by Weight |
| --- | --- |
| Polyol C | 100.0 |
| Solution L | 4.3 |
| Stannous Octoate | 0.15 |
| Mixture of 2,4- and 2,6-tolylene diisocyanates (105 Index) | 36.5 |

| Type of foam test | Solution L | | | Quality of foam | | |
| --- | --- | --- | --- | --- | --- | --- |
| | Days aging | Clarity at 95° F. | Rise, inches | Nopco breath-ability, s.c.f.m. | C.p.i. | Cell uniformity |
| 4-finger channel mold. | 0 | Clear | | 0.06 | 60 | Good. |
| | 40 | ...do | | 0.04 | 60 | Do. |
| Free rise | 0 | ...do | 4.8 | 1.95 | 30 | Do. |
| | 90 | ...do | 4.5 | 1.95 | 30 | Do. |

The results of above Table V demonstrate that Solution L had good storage stability for at least 90 days and that the performance thereof after aging was substantially the same as the freshly prepared solution.

EXAMPLE XII

Additional premixtures, designated as Solutions M, K-2 and K-3, were prepared based, respectively, on Copolymer A, Copolymer I and Copolymer II. As shown by Table II above, these siloxane-oxyalkylene block copolymers have different terminal groups on the oxyalkylene blocks. The components and relative proportions thereof in each solution are as follows:

| Component | Parts by Weight |
| --- | --- |
| Water | 80.9 |
| Dimethylethanolamine | 5.8 |
| Copolymer (A, I or II) | 13.3 |
| Adducts of 10.5 moles of ethylene oxide and one mole of nonylphenol | 13.3 |

Each of Solutions M, K-2 and K-3 were aged at 122° F. and their performance in the formation of flexible foams was tested. Foams were prepared periodically using the foam formulation given in Table VI, basing components on 350 grams of polyether polyol and pouring into a 12 inches × 12 inches × 12 inches mold.

TABLE VI

| Component | Parts by weight |
| --- | --- |
| Polyol D | 100.0 |
| Premix (Solution M, K-2 or K-3) | 6.8 |
| Stannous octoate | 0.3 |
| Trichlorofluoromethane | 15.0 |
| Mixture of 2,4- and 2,6- tolylene diisocyanate (106 index) | 57.0 |

| Solution | Copolymer component | Days aging at 122° F. | Appearance of solutions at 122° F. and room temperature | Rise, inches | NOPCO breathability | C.p.i. |
| --- | --- | --- | --- | --- | --- | --- |
| M | A | 0 | Clear | 12.3 | 4.7 | 38 |
| *K-2 | I | 0 | ...do | 12.3 | 1.0 | 34 |
| *K-3 | II | 0 | ...do | 12.3 | 5.2 | 38 |
| M | A | 3 | ...do | 12.2 | 4.2 | 42 |
| *K-2 | I | 3 | ...do | 12.0 | 0.15 | 32 |
| *K-3 | II | 3 | ...do | 12.3 | 0.10 | 40 |
| M | A | 21 | ...do | 11.8 | 4.3 | 38 |
| *K-2 | I | 21 | ...do | 12.0 | 0.15 | 32 |
| *K-3 | II | 21 | ...do | 12.5 | 0.30 | 30 |

*Presented for comparative purposes; not a solution of the invention.

Results shown in Table VI above demonstrate that in every instance the nonionic organic surfactant present in Solutions M, K-2 and K-3 provided clear premixes at 122° F. However, Solution K-2, containing Copolymer I in which the oxyalkylene blocks have terminal hydroxyl groups, gave very tight foams throughout the test indicating poor breathability. Solution K-3, containing Copolymer II in which the oxyalkylene blocks are acetoxy-capped, gave very tight foam within three days, indicating essentially complete hydrolysis of the acetoxy groups to hydroxyl terminal groups. In contrast, Solution M, containing Copolymer A in which the oxyalkylene blocks are capped by hydrolytically stable methoxy groups, gave good performance in the foaming reaction mixture over the 21 day period of the test.

EXAMPLE XIII

In this example, Copolymer A was aged at 122° F. in a solution, designated as Solution K-4, to which no organic surfactant was added. Solution K-4 had the following composition:

| Component | Parts by Weight |
| --- | --- |
| Water | 80.9 |
| Dimethylethanolamine | 5.8 |
| Copolymer A | 13.3 |

At 122° F. Solution K-4 was cloudy, and during the test period two layers formed. Without reconstituting the mixture such as by stirring, aliquots for foam tests were taken from top and bottom layers. The following foam formulation was used and the results are given in Table VII.

FOAM FORMULATION

| Component | Parts by Weight |
|---|---|
| Polyol D | 100.0 |
| Stannous Octoate | 0.3 |
| Trichlorofluoromethane | 15.0 |
| Solution K-4 | 6.0 |
| Mixture of 2,4- and 2,6- tolylene diisocyanates (106 Index) | 57.0 |

TABLE VII

| Layer | Days Aging at 122° F. | Rise, Inches | Nopco Breath-ability | CPI |
|---|---|---|---|---|
| — | 0* | 12.3 | 4.3 | 38 |
| Top | 21 | 12.5 | 6.7 | 29 |
| Bottom | 21 | 12.5 | 1.0 | 32 |

*Control sample run before heating; at this point Solution K-4 was clear

Results in Table VII show that aliquots from different locations in Solution K-4 did not provide the same foam quality. This contrasts with the reproducible foams obtained when Copolymer A was aged in the presence of an organic surfactant, as illustrated in Example XII.

EXAMPLE XIV

The objective of this test was to determine stability of the premixed solution compositions with respect to utility to make good foam after accelerated aging and with respect to cloud point stability, regardless of solution clarity. A solution, designated as Solution N and corresponding in composition to that of Solution H of Table IV above, was aged at 122° F. The composition of Solution N is as follows wherein the organic surfactant component is the adduct produced by reacting one mole of nonylphenol with 15 moles of ethylene oxide.

SOLUTION N

| Component | Parts by Weight |
|---|---|
| Water | 62.7 |
| Amine Catalyst A | 1.8 |
| Amine Catalyst B | 5.2 |
| Copolymer A | 16.7 |
| $C_9H_{19}C_6H_4(OC_2H_4)_eOH$ wherein the average value of $e$ is about 15 | 13.6 |

As a control, Solution K-5 was prepared having a composition corresponding to that of Solution K of Table IV, that is, it contained the same components and amounts thereof as in Solution N of this example, except that Solution K-5 did not contain the added organic surfactant.

As would be indicated from the cloud point data of Table IV, at the aging temperature of 122° F., Solution N was turbid. Before making foam from the aged solution, the test sample was cooled to room temperature and reconstituted by stirring. At this point the aged sample was clear and one phase.

The following foam formulation was used for performance evaluations:

| Component | Parts by Weight |
|---|---|
| Polyol C | 100.0 |
| Premix (Solution N or Control K-5) | 4.3 |
| Stannous Octoate | 0.15 |
| Mixture of 2,4- and 2,6- tolylene diisocyanates (105 Index) | 36.5 |

Components were based on 350 grams of polyol and the respective reaction mixtures poured into a 12 inches × 12 inches × 12 inch box. The results are given in the following Table VIII.

TABLE VIII

| Solution | Days Aging at 122° F. | Premix Cloud Point, °F. | Foam Rise, Inches | Foam Breath-ability | CPI |
|---|---|---|---|---|---|
| K-5 (control) | 0 | 93 | 4.4 | 1.2 | 42 |
| N | 0 | 120 | 4.5 | 1.7 | 42 |
| K-5 (control) | 0 | 93 | 4.4 | 1.1 | 42 |
| N | 12 | 120 | 4.5 | 0.9 | 42 |

The results of Table VIII show that foams having substantially the same rise and cell structure were made using Solution N before and after aging and that with respect to the control, the breathability was also substantially the same. The results of Table VIII also show that, with respect to cloud point, there was no deterioration of Solution N during aging.

EXAMPLE XV

Further solutions, designated as Solution O and Solution K-6 were prepared based on Copolymer B of Table II above, and were aged at room temperature. The respective compositions of these solutions are as follows:

SOLUTION O

| Component | Parts by Weight |
|---|---|
| Water | 72.8 |
| N,N,N',N'-Tetramethyl-1,3-butanediamine | 1.8 |
| N-Ethyl Morpholine | 3.6 |
| Copolymer B | 10.9 |
| $C_9H_{19}C_6H_4(OC_2H_4)_eOH$ wherein the average value of $e$ is about 10.5 | 2.7 |
| Organic Solvent A | 8.2 |

SOLUTION K-6 (Control)

| Component | Parts by Weight |
|---|---|
| Water | 72.8 |
| N,N,N',N'-Tetramethyl-1,3-butanediamine | 1.8 |
| N-Ethyl Morpholine | 3.6 |
| Copolymer B | 21.8 |
| Organic Surfactant | None |

The following foam formulation was used to evaluate Solution O and Solution K-6 before and after aging:

| Component | Parts by Weight |
|---|---|
| Polyol-3000 molecular weight triol which is the adduct of propylene oxide to glycerol and has an OH No. of 56. | 100.0 |
| Premix (Solution O or K-6) | 5.5 |
| Stannous Octoate | 0.3 |
| 2,4-, 2-6-tolylene diisocyanates (105 Index) | 49.5 |

Foams were based on 350 grams of polyol and poured into a 12 inches × 12 inches × 12 inch mold. The results are given in the following Table IX.

TABLE IX

| Solution | Days aging at Room Temp. | Rise Inches | CPI | Cell Structure |
| --- | --- | --- | --- | --- |
| K-6 (Control) | 0 | 7.6 | 40-45 | good |
| 0 | 0 | 7.6 | 40-45 | good |
| K-6 | 14 | 7.5 | 40-45 | good |
| 0 | 14 | 7.6 | 40-45 | good |
| K-6 | 21 | 7.2 | 35-40 | good |
| 0 | 21 | 7.3 | 35-40 | good |
| K-6 | 28 | 7.2 | 35-40 | good |
| 0 | 28 | 7.4 | 35-40 | good |

Table IX shows that Copolymer B made good foam for at least 28 days and that the organic surfactant and organic solvent contained in Solution O had no deleterious affect on copolymer performance.

EXAMPLE XVI

A solution, designated as Solution K-7, was prepared containing the following components:

| Components | Parts by Weight |
| --- | --- |
| Water | 100.0 |
| N,N,N',N'-Tetramethyl-1,3-butanediamine | 2.5 |
| N-Ethyl Morpholine | 5.0 |
| Copolymer B | 14.9 |

Solution K-7 which is not a solution of this invention, had a cloud point of 99° F. (determined following the procedure described with reference to the cloud point data of Table IV). The addition to Solution K-7 of 14.9 parts of the product which is obtained by reacting 10.5 moles of ethylene oxide and one mole of nonylphenol, provided Solution P of this invention. Solution P had a cloud point of 127° F.

In addition to the particular nonionic organic surfactants employed in the above examples, other water soluble, silicon-free organic surfactants can be used which are capable of raising the cloud point of aqueous solutions of the siloxane-oxyalkylene block copolymer foam stabilizer and amine catalysts including other nonionics as well as anionic, cationic and amphoteric organic surfactants. For example, useful anionic, water-soluble organic surfactants include sodium and potassium salts of alkaryl sulfonates and alkyl sulfates such as sodium dodecylbenzene sulfonate and sodium lauryl sulfate. Suitable cationic, water soluble surfactants are quaternary ammonium compounds such as monolauryltrimethyl quaternary ammonium chloride. Generally, useful organic surfactants are those having a cloud point of at least about 65° F. and preferably at least about 95° F. (determined on the basis of an aqueous solution thereof containing about 1 weight percent of dissolved organic surfactant).

In addition to the siloxane-oxyalkylene block copolymers typically illustrated by Copolymers A and B of the examples, any other water soluble, hydrolytically stable copolymer which is an effective stabilizer for polyether flexible polyurethane foam can be a component of the solution compositions of this invention. Of such useful copolymers including those encompassed by general Formula A hereinabove, the preferred copolymer components for use in the present invention are those prepared by the method of my co-pending application Ser. No. 607,650, filed Jan. 6, 1967, now abandoned in favor of continuation application Ser. No. 109,587, filed Jan. 25, 1971, which method comprises reacting a siloxane having ≡SiH groups with an alkenyl-endblocked polyoxyalkylene polymer (polyether) which in turn is prepared by reacting an alkenol such as allyl alcohol, and an alkylene oxide.

As is evident from the above examples, the relative proportions of amine catalyst, siloxane-oxyalkylene copolymer and water in any particular aqueous premixture of this invention are largely dependent upon and determined by the relative proportions of such ingredients which are desired in a particular final foam-producing reaction mixture. Accordingly, in the preparation of any particular premixture of this invention, the relative proportions of the amine component, block copolymer and water are adjusted and the aqueous premixture is added to the final foam-producing formulation in an amount sufficient to satisfy the respective functions of such components and to provide a foamed product of desired quality.

What is claimed is:

1. A solution composition useful in the manufacture of polyurethane foam which comprises (1) water, (2) between about 5 and about 40 parts by weight of a siloxane-oxyalkylene block copolymer foam stabilizer having the average structure:

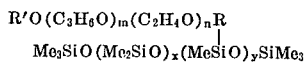

wherein R' is a monovalent hydrocarbon group containing from one to 10 carbon atoms, R is an alkylene group containing at least 2 carbon atoms, $m$ and $n$ are numbers, the sum of $m + n$ is such that the oxyalkylene block, $R'O(C_3H_6O)_m(C_2H_4O)_n$, has an average molecular weight of at least 1,500, from 15 to 60 weight percent of the oxyalkylene units are oxyethylene units, $x$ has a value of at least 40, $y$ has a value of at least 3, the siloxane block constitutes from 15 to 70 weight per cent of the block copolymer, and Me is a methyl group, (3) between about 3 and about 10 parts by weight of an amine component which is a catalyst for the reaction of a polyether polyol and a polyisocyanate, and (4) between about 0.25 and about 30 parts by weight of a water-soluble, silicon-free organic surfactant which is capable of raising the cloud point of a solution of the aforesaid components (1), (2) and (3), the aforesaid respective amounts of components (2), (3) and (4) being expressed on the basis of 100 parts by weight of the solution.

2. The solution composition of claim 1 wherein said R' group is an alkyl radical having from one to four carbon atoms, said R group contains 3 carbon atoms, $x$ has a value from 50 to 150, and $y$ has a value from 4 to 15.

3. The solution composition of claim 1 wherein the amine component is a tertiary amine.

4. The solution composition of claim 1 wherein the organic surfactant is an ethylene oxide adduct of nonylphenol having the formula, $C_9H_{19}C_6H_4(OC_2H_4)_eOH$, where the average value of $e$ is from about 9 to about 20.

5. The solution composition of claim 1 which additionally contains a water soluble organic solvent.

6. The solution composition of claim 5 wherein the water soluble organic solvent is an alkylene oxide adduct of butanol.

7. A solution composition useful in the manufacture of flexible polyether urethane foam which comprises the following components: (1) water; (2) an organic surfactant which is an ethylene oxide adduct of nonylphenol containing an average of from about 9 to about 20 moles of ethylene oxide units per mole of nonylphenol, said organic surfactant being present in an amount of between about 0.25 and about 30 parts by weight per 100 parts by weight of the solution; (3) at least one amine which is a catalyst for the polyurethane foam-producing reaction of a polyether polyol and a polyisocyanate, the amount of total amine being between about 3 and about 10 parts by weight per 100 parts by weight of the solution; and (4) a siloxane-oxyalkylene block copolymer having the average structure:

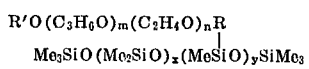

wherein R' is a monovalent hydrocarbon group containing from one to 10 carbon atoms, R is an alkylene group containing at least 2 carbon atoms, m and n are numbers, the sum of m + n being such that the oxyalkylene block, R'O(C₃H₆O)$_m$(C₂H₄O)$_n$, has an average molecular weight of at least 1,500, from 15 to 60 weight per cent of the oxyalkylene units are oxyethylene units, $x$ has a value of from 40 to about 200, $y$ has a value of from 3 to 15, the siloxane block constitutes from 15 to 70 weight percent of the block copolymer, and Me is a methyl group, the said siloxane-oxyalkylene xane-oxyalkylene block copolymer being present in said solution in an amount of between about 5 and about 40 parts by weight per 100 parts by weight of the solution; and (5) at least one water soluble organic solvent component which is a butanol-started polyether mono-ol containing oxyethylene and oxypropylene units wherein the weight per cent of oxyethylene units is about equal to the weight per cent of oxypropylene units.

8. The solution composition of claim 7 wherein the organic surfactant contains an average of about 10.5 moles of ethylene oxide units per mole of nonylphenol.

9. The solution composition of claim 7 wherein the organic surfactant contains an average of about 15 moles of ethylene oxide units per mole of nonylphenol.

10. A process for producing a flexible polyurethane foam by reacting and foaming a reaction mixture of:
   I. a polyether polyol having an average of at least two hydroxyl groups per molecule;
   II. a polyisocyanate containing at least two isocyanato groups per molecule, said polyether polyol and said polyisocyanate, taken together, being present in the reaction mixture in a major amount and said polyether polyol and polyisocyanate being present in the reaction mixture in the relative amount required to produce the polyurethane foam;
   III. a minor amount of blowing agent comprising water in an amount sufficient to foam the mixture;
   IV. a minor amount of a catalyst comprising an amine for the reaction of the polyether polyol and the polyisocyanate to produce the polyurethane; and
   V. a foam stabilizing amount of a siloxane-oxyalkylene block copolymer having the average structure represented by the formula:

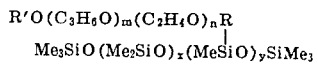

wherein R' is a monovalent hydrocarbon group containing from one to 10 carbon atoms, R is an alkylene group containing at least 2 carbon atoms, m and n are numbers, the sum of m + n is such that the oxyalkylene block, R'O(C₃H₆O)$_m$(C₂H₄O)$_n$, has an average molecular weight of at least 1,500, from 15 to 60 weight per cent of the oxyalkylene units are oxyethylene units, $x$ has a value of at least 40, $y$ has a value of at least 3, the siloxane block constitutes from 15 to 70 weight percent of the block copolymer and Me is a methyl group;

said water, amine and siloxane-oxyalkylene block copolymer being introduced to said reaction mixture in the form of a premixed solution thereof which additionally contains an organic surfactant which raises the cloud point of said premixed solution, said premixed solution containing between about 3 and about 10 parts by weight of amine, between about 5 and about 40 parts by weight of said siloxane-oxyalkylene block copolymer, and between about 0.25 and about 30 parts by weight of said organic surfactant, each concentration being expressed on the basis of 100 parts by weight of the solution.

11. The process of claim 10 wherein said premixed solution of water, amine catalyst, siloxane-oxyalkylene copolymer and organic surfactant, additionally contains a water soluble organic solvent.

12. The process of claim 10 wherein the reaction mixture comprises an auxiliary blowing agent.

13. The process of claim 12 wherein said auxiliary blowing agent is a fluorine-containing organic compound which has a boiling point below 80° F.

14. The process of claim 10 wherein said catalyst for the polyurethane-forming reaction additionally comprises a metal catalyst which is added to the reaction mixture independently of said premixed solution.

15. The process of claim 14 wherein said metal catalyst is an organo-tin compound.

16. The solution composition of claim 2 wherein said alkyl radical is a methyl group.

* * * * *

UNITED STATES PATENT OFFICE
CERTIFICATE OF CORRECTION

Patent No. 3,669,913         Issue Date June 13, 1972

Inventor(s) Edward L. Morehouse

It is certified that error appears in the above-identified patent and that said Letters Patent are hereby corrected as shown below:

Page 1, in the second line under the heading "Related U.S. Application Data" the expression "which is a continuation-in-part of" should read -- which is now continuation-in-part --. Column 3, in the fourth line under the heading thereto, "a siloxane" should read -- the siloxane --. Column 7, line 29, "ploymer" should read -- polymer --. Column 8, line 3, that portion of the formula reading "CH2h2" should read -- $CH_2CH_2$ --; line 7, "4,4',4-" should read -- 4,4',4"- --; line 25, that portion of the formula reading "ib" should read -- i --. Column 10, line 46, ";" should be -- : --. Column 11, lines 47-49, that portion of the formula reading "$(Me_3SiO)_x$" should read -- $(Me_2SiO)_x$ --. Column 12, Table III, in the right-hand column, a summation line should appear between "16.7" and "86.4". Column 13, line 57, the heading "Solution L" should not extend over the heading "Rise"; line 59, the heading "C.p.i" should read -- CPI --. Column 14, line 22, under "Table VI", read the heading -- FOAM FORMULATION --; line 34, the heading "C.p.i." should read -- CPI --. Column 16, Table VIII, under the heading "Solution" delete "°F"; under the heading "Premix Cloud Point," read -- °F --. Column 19, line 10, after the first occurrence of "-oxyalkylene" delete "xane-oxyalkylene".

Signed and sealed this 24th day of April 1973.

(SEAL)
Attest:

EDWARD M. FLETCHER, JR.       ROBERT GOTTSCHALK
Attesting Officer                 Commissioner of Patents